US008196154B2

(12) United States Patent
Glaizel et al.

(10) Patent No.: US 8,196,154 B2
(45) Date of Patent: Jun. 5, 2012

(54) COPYING WORKLOAD FILES TO A VIRTUAL DISK

(75) Inventors: Ari Glaizel, Vaughan (CA); Vladimir Koganov, Toronto (CA)

(73) Assignee: Novell, Inc., Waltham, MA (US)

( * ) Notice: Subject to any disclaimer, the term of this patent is extended or adjusted under 35 U.S.C. 154(b) by 459 days.

(21) Appl. No.: 12/489,772

(22) Filed: Jun. 23, 2009

(65) Prior Publication Data

US 2009/0327632 A1 Dec. 31, 2009

(30) Foreign Application Priority Data

Jun. 25, 2008 (WO) ................ PCT/CA2008/001190

(51) Int. Cl.
G06F 13/00 (2006.01)
(52) U.S. Cl. ........................................... 719/321; 718/1
(58) Field of Classification Search .................. 719/321; 718/1
See application file for complete search history.

(56) References Cited

U.S. PATENT DOCUMENTS

| | | | |
|---|---|---|---|
| 6,735,601 B1 | 5/2004 | Subrahmanyam | |
| 7,356,679 B1 | 4/2008 | Le et al. | |
| 7,823,145 B1 * | 10/2010 | Le et al. | 717/168 |
| 2003/0200290 A1 * | 10/2003 | Zimmerman et al. | 709/222 |
| 2005/0289218 A1 * | 12/2005 | Rothman et al. | 709/203 |
| 2006/0107087 A1 | 5/2006 | Sieroka et al. | |
| 2009/0007099 A1 * | 1/2009 | Cummings et al. | 718/1 |
| 2010/0306849 A1 * | 12/2010 | Zheng et al. | 726/24 |

FOREIGN PATENT DOCUMENTS

| | | |
|---|---|---|
| WO | 2007002397 A2 | 1/2007 |
| WO | 2008049005 A2 | 4/2008 |

OTHER PUBLICATIONS

PCT Patent Application No. PCT/CA2008/001190, International Search Report dated Feb. 15, 2009.

* cited by examiner

Primary Examiner — Andy Ho
(74) Attorney, Agent, or Firm — Neil Henderson

(57) ABSTRACT

The present invention is directed to a system and method for transferring workload files on a host to a Virtual Machine (VM) destination disk without the need for the VM to be running. This accomplished by creating a VM disk device interface to move data from the workload files to the VM destination disk. The VM disk device interface comprises a device driver to interact with the VM destination disk and destination access software utilizing standard operating system procedures to access the VM destination disk.

16 Claims, 5 Drawing Sheets

COPYING WORKLOAD FILES TO A VIRTUAL DISK

CROSS REFERENCE TO RELATED APPLICATIONS

This application claims the benefit of priority of International Patent Application No. PCT/CA2008/001190 filed Jun. 25, 2008 which is incorporated herein by reference in its entirety.

FIELD OF THE INVENTION

Embodiments of the present invention relate to a system and method for transferring work load files on a host to a virtual machine (VM) destination disk without the need for the VM to be running.

BACKGROUND OF THE INVENTION

In a computing environment including virtual and real machines, improvements in disaster recovery, data backup, workload conversion or workload imaging can be achieved using virtual disks.

A workload comprises the operating system, data and software components necessary to run an application. A workload may run on one physical server where one physical server handles the workload. In a virtual environment many workloads may run in Virtual Machines (VMs) on a virtual server.

A workload comprises multiple files, referred to as workload files. In the case of disaster recovery, changes to workload files are incrementally made to a virtual disk on a virtual server. This concept is described in detail in U.S. Application Publication No. 2008/0033902, titled "A Method for Providing Live File Transfer Between Machines", published Feb. 7, 2008, which is assigned to the owner of the owner of the present application and is included by reference. In the case of data backup workload files are copied to one or more virtual disks on a virtual server. With regard to workload conversion, a workload may be moved between physical servers, virtual servers and image servers. Workload conversion is described in detail in U.S. Patent Application Publication No. 2006/0089995, titled "System for Conversion Between Physical Machines, Virtual Machines and Machine Images", published Apr. 27, 2006, which is assigned to the owner of the present application and is included by reference. Workload imaging applies to the case of creating an image of the workload for the purpose of storing the workload image and utilizing it to recreate the workload on a Virtual Machine (VM). A workload image is described in detail in the 2006/0089995 patent application. A workload image is not a functioning workload, but rather an image of the workload that can be instantiated when required.

There is a need for utilizing virtual disks to receive workload files for the purposes of disaster recovery, data backup, workload conversion or workload imaging in a manner that seamlessly integrates with the virtual disks. The present invention addresses this need.

SUMMARY OF THE INVENTION

An embodiment of the present invention is directed to a method for transferring workload files on a host to a Virtual Machine (VM) destination disk without the need for the VM to be running, comprising the steps of: utilizing a bus driver to create a VM disk device interface; downloading said bus driver and said VM disk device interface to a VM server; and utilizing said bus driver and said VM disk device interface to transfer said workload files to said destination disk.

An embodiment of the present invention is also directed to a system for transferring workload files on a host to a Virtual Machine (VM) destination disk without the need for the VM to be running, comprising: a bus driver configured to create a VM disk device interface; means for downloading said bus driver and said VM disk device interface to a VM server; and said device driver and said VM disk device interface configured to transfer said workload files to said destination disk.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF EMBODIMENTS OF THE INVENTION

In the context of this description, a VM disk device interface is a software construct to which operations can be performed using standard disk functions in a manner that allows seamless integration with an application to provide services such as disaster recovery, data backup, workload conversion and workload imaging.

Figure 1:
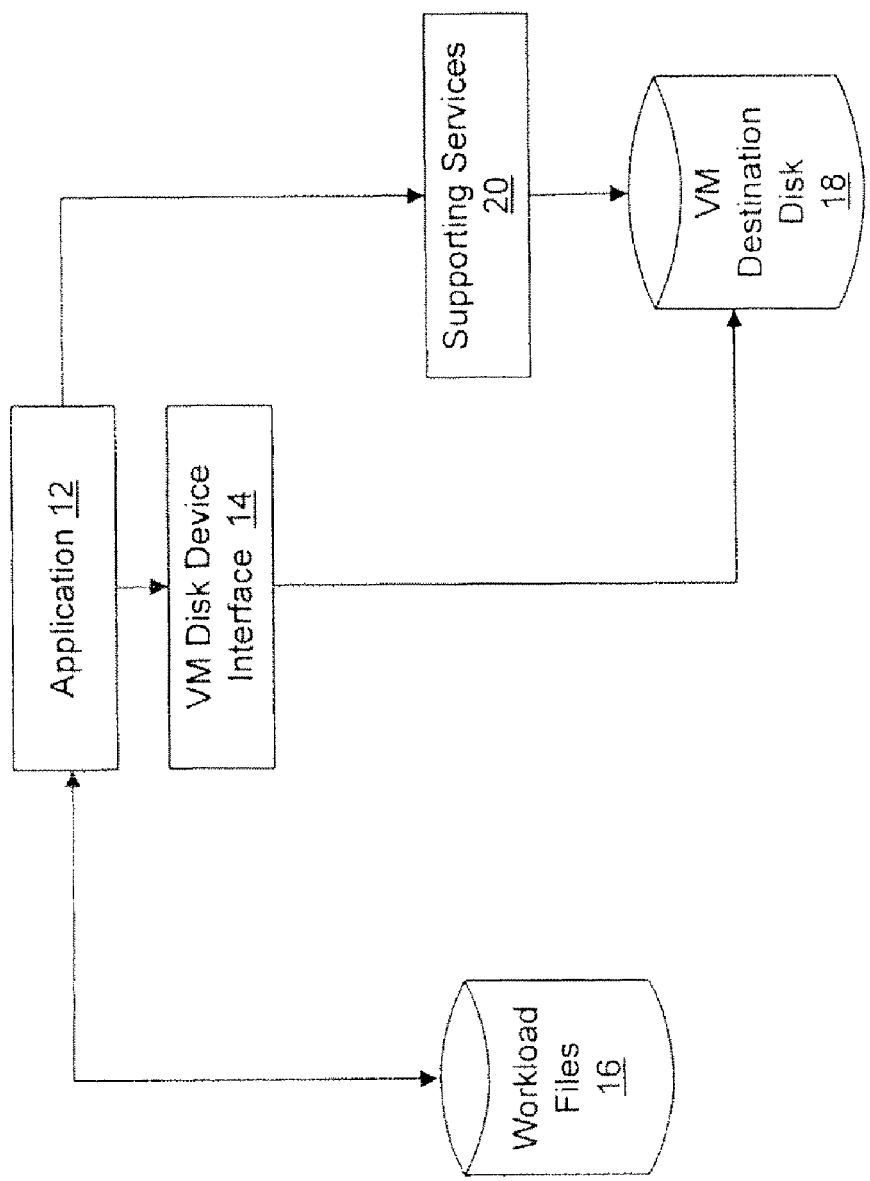
FIG. 1 is a block diagram of the components of an embodiment of the present invention.

Referring to FIG. 1 a block diagram of the components of an embodiment of the present invention is shown. Application 12 may be any type of application that provides services including those mentioned in the preceding paragraph. Application 12 accesses workload files 16 in order to copy data from the workload files 16 to VM destination disk 18, a storage device. Application 12 utilizes VM disk device interface 14 to access destination 18. Application 12 may utilize supporting service 20 for administrative functions, for example preparing for the use of VM destination disk 18 by creating a VM with an empty VM destination disk 18.

Figure 2:
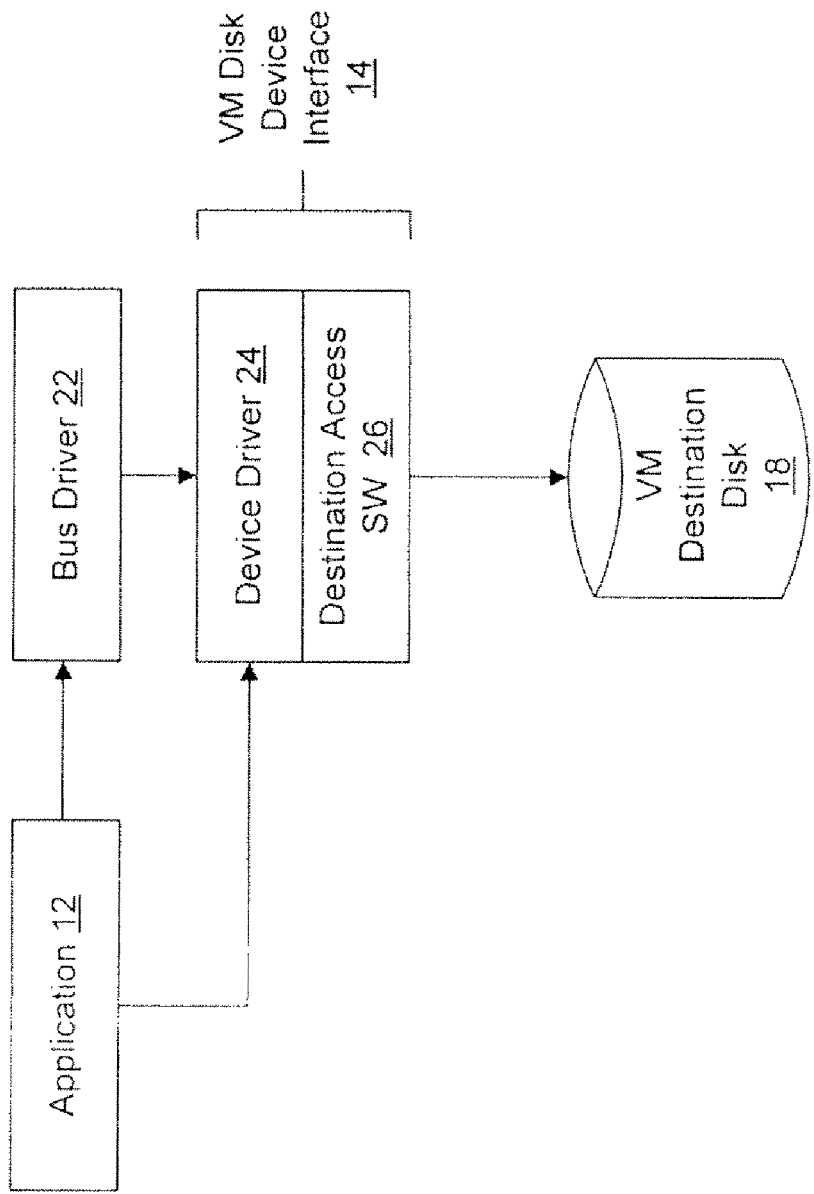
FIG. 2 is a block diagram expanding on the components of FIG. 1.

Referring now to FIG. 2 a block diagram expanding on the components of FIG. 1 is shown. VM disk device interface 14 is modeled as device driver 24 and destination access software 26. Application 12 utilizes bus driver 22 to create a VM disk interface 14 driven by device driver 24. Application 12 utilizes standard operating system disk operations such as format, partition, read and write to access VM destination disk 18. Destination access software 26 converts disk operations to the appropriate operations for accessing VM destination disk 18. By way of example, if the VM destination disk 18 is a VMware Virtual Hard Disk (VMDK) drive, then destination access software 26 would be a VMDK library provide by VMware. Similarly a workload imaging server provided by PlateSpin may be utilized as destination access software 26.

Figure 3:
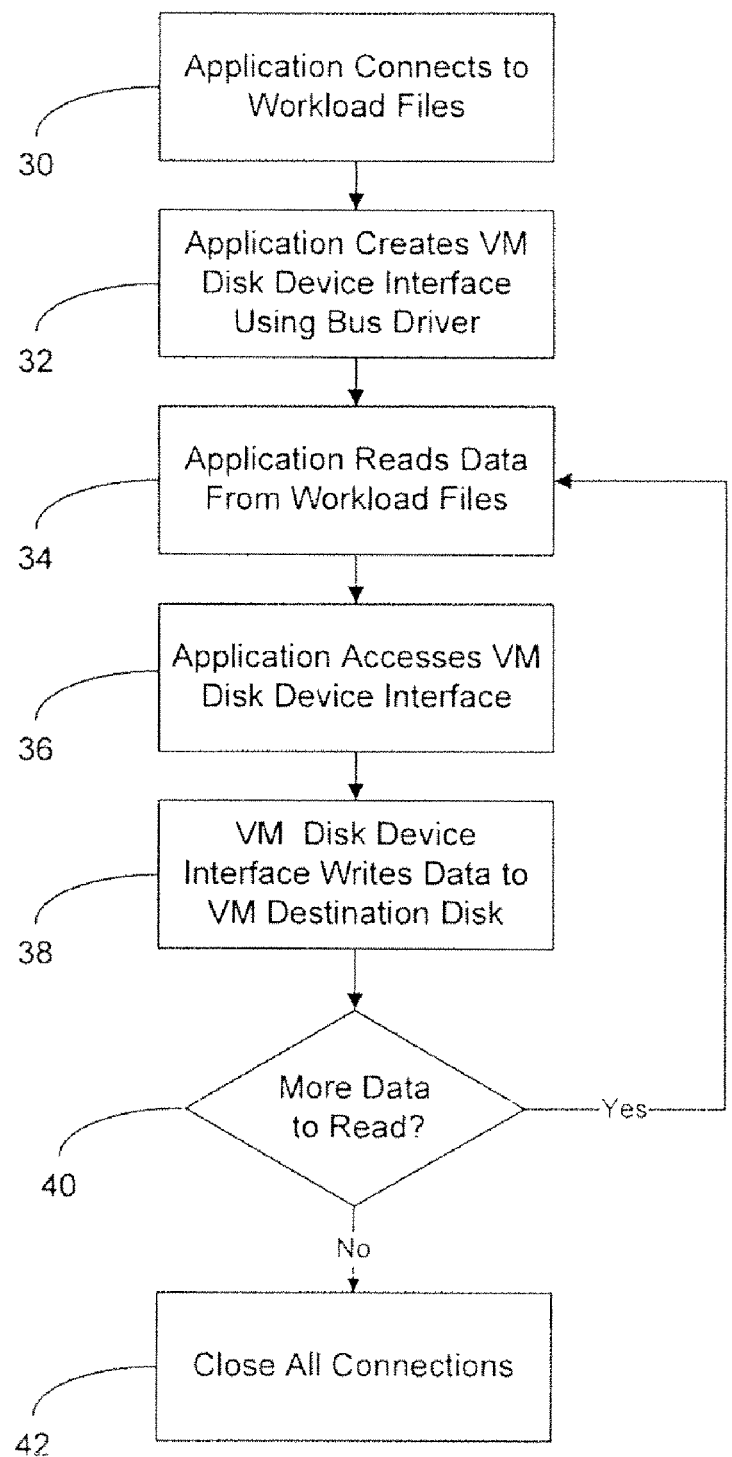
FIG. 3 is a flowchart of the steps of reading from workload files and writing to a VM destination disk.

FIG. 3 is a flowchart of the steps of reading from workload files and writing to a VM destination disk. Beginning at step 30 application 12 connects to workload files 16. At step 32 application 12 creates VM disk interface 14 driven by device driver 24 through the use of bus driver 22. At step 34 application 12 reads data from workload files 16. At step 36 application 12 accesses VM disk interface 14 utilizing standard disk operations provided by the operating system on which the VM destination disk 18 resides. At step 38 VM disk device interface 14 writes data obtained at step 34 to VM destination disk 18. At step 40 a test is made to determine if any more data is to be read from workload files 16. If there is more data to be read processing returns to step 34. If no data remains to be read, processing moves to step 42 where the connections to the workload files 16 and the VM destination disk 18 are closed by application 12.

Figure 4:
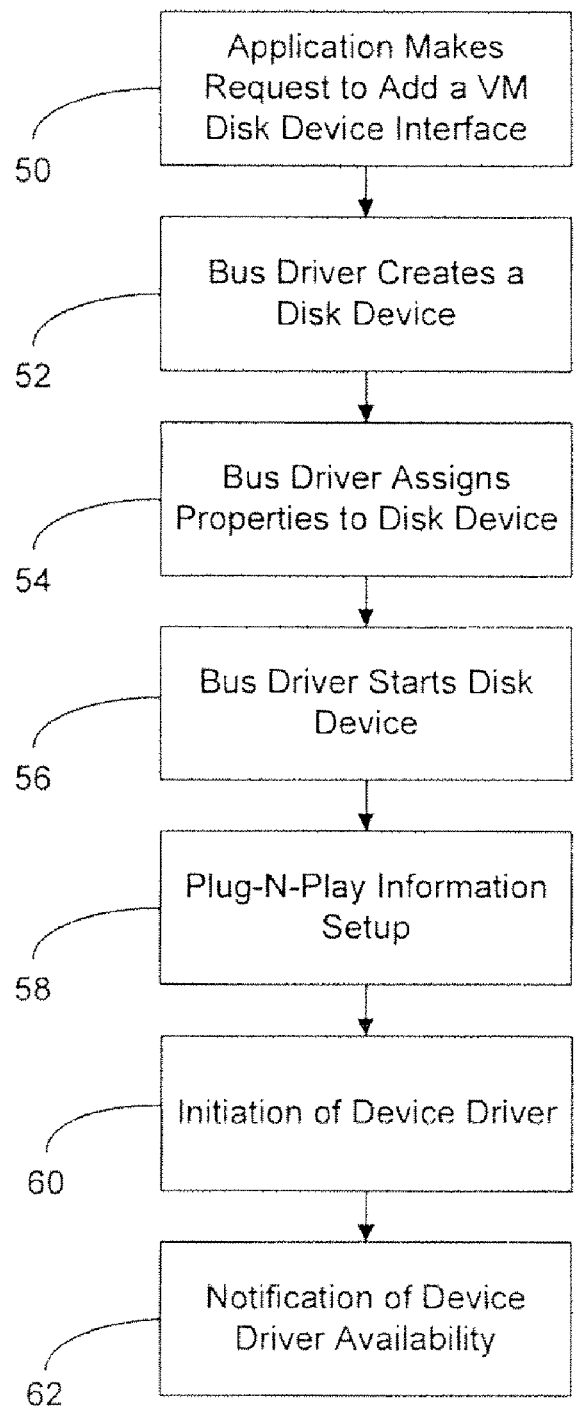
FIG. 4 is a flowchart of the steps for creating a VM disk device interface.

Referring now to FIG. 4 a flowchart of the steps for creating a VM disk device interface is shown. This is an expansion of step 32 of FIG. 3. Beginning at step 50 application 12 requests bus driver 22 to create a VM disk device interface 14. In this request, information such as the filename associated with a Virtual Hard Disk (VHD) or VMware Virtual Hard Disk (VMDK) is passed to bus driver 22. At step 52 bus driver 22 creates a disk device. The disk device is an internal abstraction of device driver 24. The disk device converts standard disk commands such as format, read and write to the appropriate commands that the destination access software 26 requires to access the VM destination disk 18. At step 54 bus driver 22 assigns properties to the disk device such as the name, size and location of the VM destination disk 18. At step 56 bus driver 22 starts the disk device, which prepares the VM disk device interface 14 for operation. This is the equivalent of plugging in physical hardware. At step 58 the plug-n-play information for the disk device is set up to prepare the operating system for the use of device driver 24. At step 60 the device driver 24 is created based upon the configuration of the disk device. At step 62 the process ends when the application 12 is notified by the bus driver 22 that a device driver 24 has been created and as is now available for use.

Figure 5:
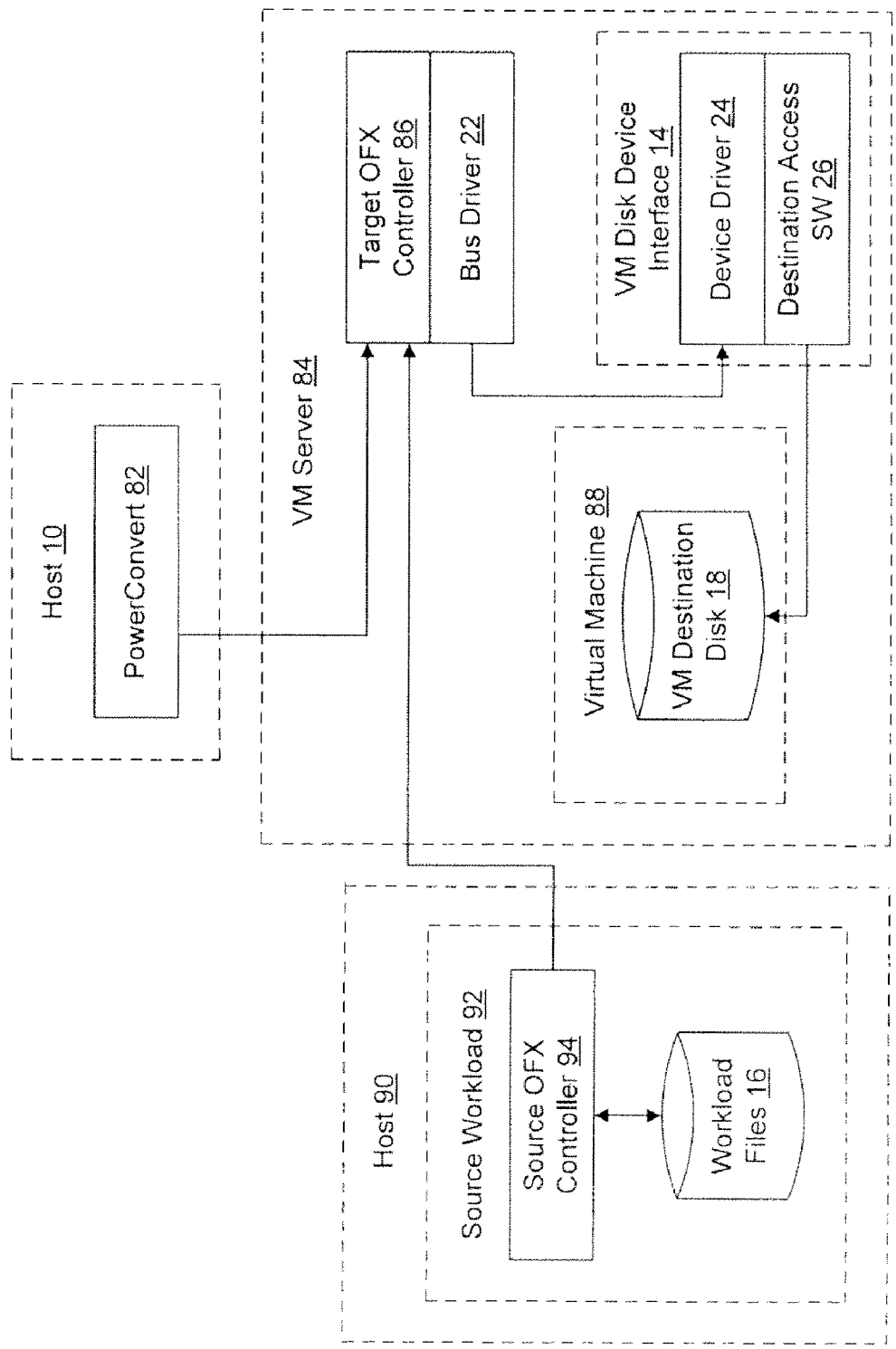
FIG. 5 is a block diagram of a system utilizing an embodiment of the invention.

Referring now to FIG. 5 a block diagram of a system utilizing an embodiment of the invention is shown. The embodiment shown in FIG. 5 can be part of a solution for disaster recovery, data backup, workload conversion, or workload imaging. For disaster recovery, changes in the workload files 16, i.e. the disk being protected, are incrementally made to the VM destination disk 18. For data backup, the data on the workload files 16 targeted for backup is copied to the VM destination disk 18. For workload conversion, workload files 16 are copied to VM destination disk 18 and Virtual Machine 18 is then configured to be the replacement of source workload 92. For workload imaging, the workload files 16 associated with source workload 92, i.e. the data, applications and operating systems residing on the physical or virtual host 90, are stored on the destination disk 18 in a manner that can be retrieved and instantiated later.

PowerConvert server 82, as an example of an application 12, runs on a host 10. Application 12 downloads, source OFX controller 94 to run within source workload 92 on host 90 and also downloads target OFX controller 86 to run on VM server 84. A complete description of the functionality of PowerConvert server 82 and OFX controllers, 86 and 94 are described in detail in US Patent Application Publication No. 2006/0089995, entitled "System for Conversion Between Physical Machines, Virtual Machines and Machine Images", published Apr. 27, 2006, which is assigned to the owner of the present application and is hereby included by reference. It is not the intent of the inventors to restrict embodiments of the present invention to the use of these components but rather to provide and example of how an existing technology may make use of the present invention.

VM server 84 is the host upon which a virtual machine 88 is running. Although only one VM machine 88 with a single VM destination disk 18 is shown, there may be multiple VM machines 88 and multiple VM destination disks 18. For disaster recovery and workload conversion, the VM server 84 is required to be running. For data backup and workload imaging VM server 84 is not required to be running. FIG. 5 illustrates a general solution for disaster recovery and workload conversion. The goal is to have workload files 16 replicated as VM destination disk 18. PowerConvert 82 is responsible for initiating and monitoring the process. Target OFX control 86 is downloaded by PowerConvert 82 and run on VM server 84. Similarly, source OFX controller 94 is downloaded by PowerConvert 82 to run on host 90. Source OFX controller 94 is able communicate directly to target OFX controller 86 in order to pass information allowing for workload conversion and disaster recovery to occur. Target OFX controller 86 uses bus driver 22 to create device driver 24 as discussed previously. This allows file information sent from source OFX controller 94 to be written directly to VM destination disk 18 utilizing destination access software 26 without requiring virtual machine 88 to be operational.

In embodiment shown in FIG. 5 for data backup, VM server 84 would be replaced with a backup server and virtual machine 88 would not be required as VM destination disk 18 would reside directly on the backup server. In the case of workload imaging the same would apply, VM server 84 would be replaced with an imaging server and virtual machine 88 would not be required as VM destination disk 18 would reside on the directly on the imaging server.

With this strategy, the VM destination disk 18 can be used as part of a solution for disaster recovery, data backup, workload conversion or workload imaging. For disaster recovery, changes in the workload files 16 are incrementally made to the VM destination disk 18. For data backup, the data on the workload files 16 targeted for backup is copied to the VM destination disk 18. For workload conversion, the necessary workload files 16 to create a new workload are moved to VM destination disk 18 to allow the workload to be converted. For workload imaging, the workload files 16 associated with a given workload, i.e. the data, applications and operating systems residing on the physical or virtual host 90, are stored on VM destination disk 18 in a manner that can be retrieved and instantiated later.

The basic premise is to model the destination access software 26 providing access to the VM destination disk 18 as a pluggable operating system specific disk by using device driver 24. In this manner the VM destination disk 18, whether it is local or remote, can be accessed using standard operating system commands and does not require the virtual machine 88 to be running. For example, VMware, a virtualization company, models its virtual disks using a Virtual Machine Disk Format, VMDK. They also provide an API to perform VMDK maintenance tasks. By creating a device driver 24 to access the VMDK API, the destination disk 18 can be accessed from Windows or other operating systems as it would other drives. Other proprietary image formats can be used in a similar manner.

Previous solutions for disaster recovery and workload conversion required the destination virtual machine to be running in a mode that was conducive to the operation. This means the destination virtual machine must be under the control of an application that allows the disaster recovery or workload conversion process to take place, this is termed take-control. With embodiments of the invention disclosed herein, the virtual machine 88 can be powered off and the data can be directly transferred to the VM destination disks 18 of the virtual machine 88. This avoids the complexity and pit falls surrounding take-control.

By modeling the VM destination disk 18 as a mountable disk, the complexity surrounding remote access to a virtual disk is centralized in a single location, the VM disk interface 14, thus simplifying software development as the developer can use familiar disk maintenance libraries.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will recognize that the present invention is structured to be portable across operating systems and easily adaptable to different computing environments and other virtual machine technology. With this invention, the VM destination disk can be used as part of a solution for disaster recovery, data backup, workload conversion or workload imaging.

APPENDIX 1

When the disk needs to be attached, the user (or application) send an IOCTL_PSVD_PLUGIN_DISK (or IOCTL_PSVD_PLUGIN_REMOTE_DISK if we are remotely mounting an ESX3 disk) to the bus driver object itself.
This causes the bus driver object to do the following tasks:
1) Parameters are validated to ensure that the disk we are attempting to mount is valid.
2) Set up a WDF_CHILD_IDENTIFICATION_DESCRIPTION_HEADER containing the required information to keep track of the new device.
3) Invoke WdfChildListAddOrUpdateChildDescriptionAsPresent to notify the bus driver that a new child is present.
4) Upon previous invocation, the "create device" callback function in the bus driver is invoked to initialize this new device. The callback function does:
   a) Initialize user-friendly descriptions for the device;
   b) Assign parameter specific information to the device (file name, references to the bus driver, etc.);
   c) PnP power capabilities are set up;
   d) Callback interface is set up so the disk driver can report its success in starting up; and
   e) Child Device is started up.
5) Child device startup is complicated in itself and contains a number of sub steps. The FDO begins its initialization via the OnDeviceAdd callback.
   a) This sets up the FDO to be a FILE_DEVICE_BUS_EXTENDER, which is required for the driver model;
   b) PnP power event callbacks are set up so that we can respond to various power events such as suspend, resume, etc.;
   c) Queues are set up to respond to external events; and
   d) PDO for the virtual disk is created.
6) The PDO for the virtual disk performs a number of tasks:
   a) The disk is created to appear and feel like a real disk-drive containing the following hardware ID and compatible ID Information:
DECLARE_CONST_UNICODE_STRING(deviceInstanceId, L"SCSI\\DISK&VEN_PS&PROD_POWERCONVERT&REV_1.0"
   DECLARE_CONST_UNICODE_STRING(hwId, L"SCSI\\Disk_____PS_____PowerConvert1.0");
   DECLARE_CONST_UNICODE_STRING(hwId2, L"SCSI\\Disk_____PS_____PowerConvert");
   DECLARE_CONST_UNICODE_STRING(hwId3, L"SCSI\\Disk_____PS");
   DECLARE_CONST_UNICODE_STRING(hwId4, L"SCSI\_____PS_____PowerConvert1");
   DECLARE_CONST_UNICODE_STRING(hwId5, L"_____PS_____PowerConvert1");
   DECLARE_CONST_UNICODE_STRING(hwId6, L"GenDisk");
   DECLARE_CONST_UNICODE_STRING(compatId, L"SCSI\\Disk");
   DECLARE_CONST_UNICODE_STRING(compatId2, L"SCSI\\RAW");
   b) the device is initialized as a FILE_DEVICE_MASS_STORAGE device, which is required for custom software based disk drives;
   c) Device is given the name: PlateSpin Virtual Disk Bus XXXX—where XXXX is the filename. This appears in the device manager;
   d) Cache important information about the virtual disk image file so we know how to read it after the disk driver is initialized.
   e) Initialize the default IO queue for the disk driver, providing internal cal backs for various IO events.
   f) Inform the driver to 'power on', invoking its power on tasks.
7) During the next phase, the device is powered on, which is responsible for loading the image file into memory. (This is represented by the EvtDeviceD0Entry callback).
   a) Based on the image file size, a geometry is calculated so that we know how to read and write to the data;
   b) SCSI_ADDRESS structure is initialized; and
   c) STORAGE_DEVICE_DESCRIPTOR structure is initialized.
8) We now have a running disk device with all internal structures initialized to respond as a normal disk.

What is claimed is:

1. A method for transferring workload files on a host to a Virtual Machine (VM) destination disk without the need for the VM to be running, comprising the steps of:
utilizing a bus driver to create a VM disk device interface;
downloading said bus driver and said VM disk device interface to a VM server; and
utilizing said bus driver and said VM disk device interface to transfer said workload files to said destination disk.

2. The method of claim 1 wherein the creation of said VM disk device interface comprises the creation of a device driver coupled with destination access software.

3. A non-transitory computer readable storage medium, said storage medium comprising instructions for executing the method of claim 2.

4. The method of claim 1 wherein said VM is replaced with a backup server for the purpose of data backup.

5. The method of claim 4 wherein said backup server writes directly to said destination disk.

6. A non-transitory computer readable storage medium, said storage medium comprising instructions for executing the method of claim 4.

7. The method of claim 1 wherein said VM is replaced with an imaging server for the purpose of workload imaging.

8. The method of claim 7 wherein said imaging server writes directly to said destination disk.

9. A non-transitory computer readable storage medium, said storage medium, comprising instructions for executing the method of claim 7.

10. A non-transitory computer readable storage medium, said storage medium comprising instructions for executing the method of claim 1.

11. A system for transferring workload files on a host to a Virtual Machine (VM) destination disk without the need for the VM to be running, comprising:
- a bus driver configured to create a VM disk device interface;
- means for downloading said bus driver and said VM disk device interface to a VM server; and
- said device driver and said VM disk device interface configured to transfer said workload files to said destination disk.

12. The system of claim 11 wherein the said VM disk device interface comprises a device driver coupled with destination access software.

13. The system of claim 11 wherein said VM is replaced with a backup server for the purpose of data backup.

14. The system of claim 13 wherein said backup server is configured to write directly to said destination disk.

15. The system of claim 11 wherein said VM is replaced with an imaging server for the purpose of workload imaging.

16. The system of claim 13 wherein an imaging server is configured to write directly to said destination disk.

* * * * *